United States Patent [19]
Tolliver et al.

[11] Patent Number: 5,634,312
[45] Date of Patent: *Jun. 3, 1997

[54] SHEAR BOLT CONNECTED STRUCTURAL UNITS

[75] Inventors: Wilbur E. Tolliver, Rockford; Larry R. Magnuson, Muskegon, both of Mich.

[73] Assignee: Independent Concrete Pipe, Mishawaka, Ind.

[*] Notice: The term of this patent shall not extend beyond the expiration date of Pat. No. 5,309,691.

[21] Appl. No.: 239,049

[22] Filed: May 6, 1994

Related U.S. Application Data

[63] Continuation-in-part of Ser. No. 842,086, Feb. 26, 1992, Pat. No. 5,309,691.

[51] Int. Cl.⁶ .................................................. E04B 2/08
[52] U.S. Cl. ...................... 52/585.1; 52/583.1; 52/586.1; 285/230; 285/368; 285/393; 405/152; 405/153
[58] Field of Search ................................ 52/585.1, 583.1, 52/586.1; 405/152, 153; 285/230, 368, 393; 411/383, 386, 432; 49/489.1

[56] References Cited

U.S. PATENT DOCUMENTS

| | | |
|---|---|---|
| 342,280 | 5/1886 | Burdick . |
| 1,120,471 | 12/1914 | Franklin . |
| 1,144,200 | 6/1915 | Hewett . |
| 1,271,708 | 7/1918 | Horstman . |
| 1,441,736 | 1/1923 | Metzsch . |
| 1,443,162 | 1/1923 | Bent . |

(List continued on next page.)

FOREIGN PATENT DOCUMENTS

| | | |
|---|---|---|
| 645343 | 7/1962 | Canada . |
| 1004186 | 5/1964 | United Kingdom . |
| 2100772 | 1/1983 | United Kingdom . |

OTHER PUBLICATIONS

Exhibit A includes pp. 14–29 and 14–33 from the Mar. 1992 issue of National Underground Construction Association (NUCA) magazine, including articles disclosing various technologies concerning trenchless excavation construction methods, including jacking and related matters.

(List continued on next page.)

*Primary Examiner*—Carl D. Friedman
*Assistant Examiner*—Christopher Todd Kent
*Attorney, Agent, or Firm*—Price, Heneveld, Cooper, DeWitt & Litton

[57] ABSTRACT

An apparatus is disclosed for joining structural units. A structural unit, such as a precast concrete section of pipe, decking, bridge structure, building structure, or pavement, includes a plurality of spaced, longitudinally aligned tubular members. The ends of each structural unit are flush, and the ends of the tubular members are flush with the ends of the structural units. When two of such units are to be joined together, a guide member is inserted in one end of each of the first tubular members in the first structural unit, while an internally threaded insert member is inserted into a corresponding end of each tubular member in the second structural unit. The guide members and insert members have axial apertures with the aperture in the insert member being internally threaded. The two structural units are brought together so that each guide member on the first structural unit enters into the corresponding end of the tubular members containing the inserts in the second structural unit. A bolt is passed through each guide member and is threaded into the internally threaded aperture in the insert member. The bolts are tightened to join the two structural units together. A resilient gasket is cast into one end of a structural unit when it is formed or it is inserted into a groove which is formed in a face of a structural unit at the time the structural unit is formed. The resilient gasket is compressed between the surfaces of the two concrete sections thus forming a face seal at the joint therebetween. A method of assembling the structural units, and also a method of installing the structural units by jacking, are also disclosed.

49 Claims, 5 Drawing Sheets

U.S. PATENT DOCUMENTS

| | | |
|---|---|---|
| 1,579,285 | 4/1926 | Danaher et al. . |
| 1,670,625 | 5/1928 | Johannesson . |
| 1,765,664 | 6/1930 | Flath . |
| 1,774,664 | 9/1930 | Parmley . |
| 2,005,699 | 6/1935 | Gottwald . |
| 2,042,132 | 5/1936 | Treskow . |
| 2,488,245 | 11/1949 | Smith . |
| 2,732,230 | 1/1956 | Risley et al. . |
| 3,090,646 | 5/1963 | Johnson ............................. 49/489.1 X |
| 3,333,388 | 8/1967 | Sandin . |
| 3,502,356 | 3/1970 | Schmunk ................................ 285/230 |
| 3,567,233 | 3/1971 | Stepanich ............................... 285/230 |
| 3,677,581 | 7/1972 | Breitfuss . |
| 3,871,183 | 3/1975 | Cardwell et al. ...................... 405/153 |
| 4,026,582 | 5/1977 | Abe et al. . |
| 4,047,388 | 9/1977 | Howlett . |
| 4,070,848 | 1/1978 | Lingle . |
| 4,117,872 | 10/1978 | Gott et al. . |
| 4,199,158 | 4/1980 | de Munck . |
| 4,496,259 | 1/1985 | Foucher . |
| 4,497,590 | 2/1985 | Chase . |
| 4,545,701 | 10/1985 | Tsuzuki ................................... 405/153 |
| 4,606,671 | 8/1986 | Rasmussen . |
| 4,781,006 | 11/1988 | Haynes . |
| 4,830,536 | 5/1989 | Birch et al. . |
| 4,900,607 | 2/1990 | Glang et al. . |
| 4,930,677 | 6/1990 | Jolliffee . |

OTHER PUBLICATIONS

Exhibit C is a report entitled "Market Impact Report #23" published by the American Concrete Pipe Association, received the week of Apr. 24, 1994, which discloses governmental activity in tube–based transportation.

Exhibit D is an article entitled "Alaska–Siberia Bridge" published in the Apr. 1993 issue of Popular Mechanics, pp. 56–58, authored by Gregory T. Pope, disclosing a tube–based bridge and tunnel.

Exhibit B is an article entitled "NUCA Microtunnelling Pipe Standards Task Group, Concrete Pipe Section" published Feb. 23, 1993, which includes a specification for reinforced concrete pipe and discloses compressible bearing strips.

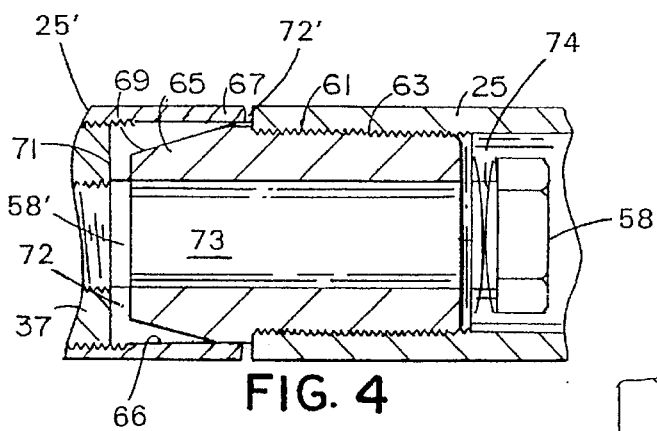
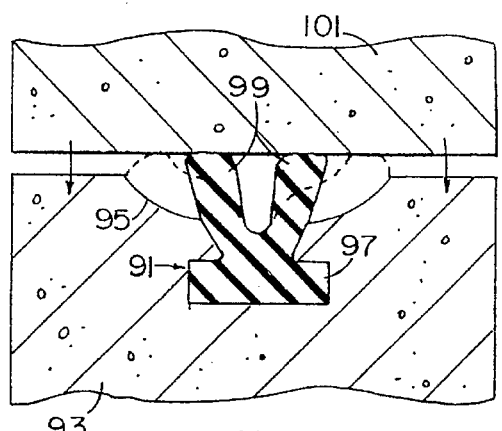
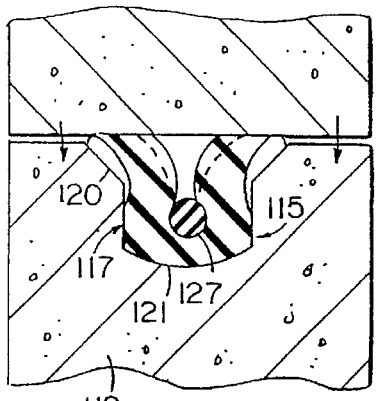
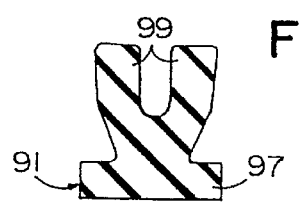
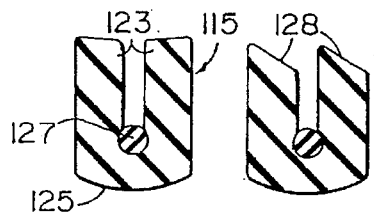
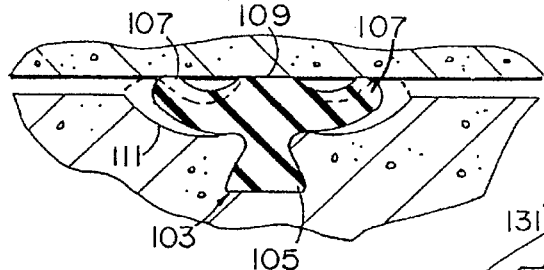
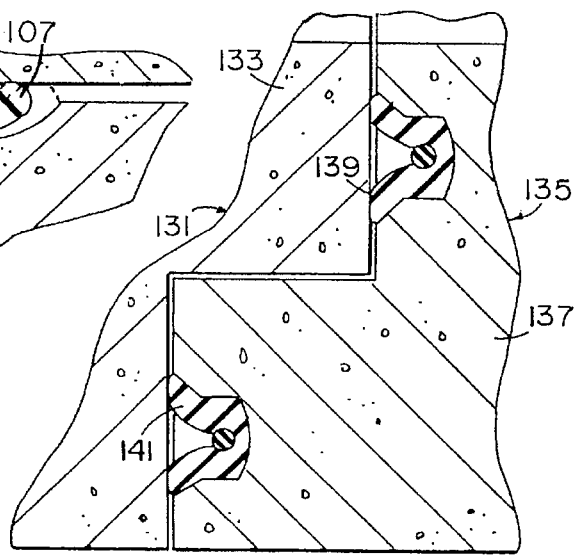

SHEAR BOLT CONNECTED STRUCTURAL UNITS

CROSS REFERENCE TO RELATED APPLICATION

This is a continuation-in-part of U.S. patent application Ser. No. 07/842,086, filed Feb. 26, 1992, now U.S. Pat. No. 5,309,691, and entitled SHEAR BOLT CONNECTED STRUCTURAL UNITS, the disclosure of which is incorporated herein by reference. The inventors are the same.

BACKGROUND OF THE INVENTION

The present invention concerns structural units, and in particular concerns interconnected concrete structural units, although in its broader aspects the present invention is not limited to only concrete materials.

In the past, concrete pipe sections have been connected to form sewer lines, drains or culverts by using a male and female type of connection such as a bell and spigot or tongue-and-groove. The spigot or tongue is a tapered end while the bell or groove is flared. The spigot end on one pipe is inserted into the flared end on another pipe. Often, rubber gaskets have been placed on the spigot with the gasket rings being deformed and compressed in making the joint in order to seal the joint. Also, the joint can be filled with mortar or asphalt. One or both of the rubber gasket and the mortar/asphalt are used to seal the pipe joint. However, the pipe settles over time and the joints tend to open causing the mortar or asphalt to crack, and/or the gasket sealing force to be lost (decreased).

In order to provide a more rigid and lasting connection, sections of concrete pipe were cast with the ends of reinforcing rods projecting out of the pipe at one end and with an aperture or recess at the other end for receiving the end of the reinforcing rod from a section of pipe to be joined. The ends of the reinforcing rods were threaded and washers and threaded nuts were used to fasten the sections together. This method presents a serious problem in that the threaded ends of the reinforcing rods can be damaged in shipping or in joining sections of pipe together, destroying the usefulness of the entire section of pipe.

Other techniques have also been used, such as hook-and-eye methods; however, these also suffered like the exposed reinforcing rods from damage in shipping or in assembling pipe sections together.

SUMMARY OF THE PRESENT INVENTION

In accordance with the present invention, an improved apparatus is provided for assembling structural units, such as pipe, decking such as bridge sections, wall panels, and pavement sections. The structural units include a plurality of spaced longitudinally aligned tubular members. Each end of the structural unit is substantially flush and is bounded by a rounded edge to reduce the tendency for the concrete to chip. The ends of the included tubular members are also preferably flush with the end surfaces of the structural units. The structural units can be shipped or transported without fear of damage to the apparatus used to join the units together.

When the structural unit arrives at the construction site, using precast concrete pipe as an example of the invention and not by way of limitation, the apparatus used to join the pipe sections together can then be installed. In sections of precast concrete box pipe, for example, the tubular members would be cast into the corners of the pipe in the space between the haunch of the pipe and the corner. The ends of each tubular member are preferably internally threaded. A guide member having a threaded portion and a shaped portion with a sloping or tapered surface is threaded into one end of each tubular member in one section of the precast concrete box pipe. The guide member has an axially aligned aperture and a circumferential shear surface on the shaped surface where the guide member abuts the end of the tubular member when threaded into place.

An insert member having an outer threaded surface and an internally threaded axial aperture is threaded into the internally threaded tubular members in a second section of precast concrete box pipe. The sections of pipe are then brought together and the projecting guide surfaces help to align the pipes as the guide members enter the end of the tubular member containing the internally threaded insert member. After the two sections of pipe are brought together and aligned, a threaded bolt is passed through the axial aperture in each guide member into the aperture in the insert members. The bolts are then tightened to firmly join the two sections of pipe together.

In order to provide a watertight seal between the two sections of pipe, a flexible gasket can be mounted on the end of the pipe. The gasket is preferably precast into one end of the pipe or a groove can be formed in the end of the pipe when it is cast. A flexible U-shaped gasket can be placed into the groove and a polymeric cord, an O-ring cord, can be forced to the bottom of the U-shaped gasket, between the spaced side portions of the gasket, to securely lock the gasket in place in the groove.

These and other advantages, purposes and features of the invention will become more apparent from a study of the following description taken in conjunction with the drawings described below.

BRIEF DESCRIPTION OF THE DRAWINGS

For a more complete understanding of the present invention, and the advantages thereof, reference is now made to the following descriptions taken in conjunction with the accompanying drawings in which:

FIG. 4 is a sectional view of a second embodiment of a guide member;

FIG. 5 is a sectional view of a cast-in-place gasket as a joint is being closed;

FIG. 6 is a cross-sectional view of a gasket which is cast in place when in use;

FIG. 7 is a sectional view of a second embodiment of a cast-in-place gasket;

FIG. 8 is a sectional view of an inserted gasket in place between two precast concrete units as a joint is being formed;

FIG. 9A is a cross-sectional view of a gasket for insertion into a groove formed in a concrete unit;

FIG. 9B is a gasket similar to that of FIG. 9a with shaped edges;

FIG. 10A is a sectional view showing possible positions for placement of a gasket in a male and female pipe joint;

DETAILED DESCRIPTION OF THE PREFERRED EMBODIMENTS

Figure 1:
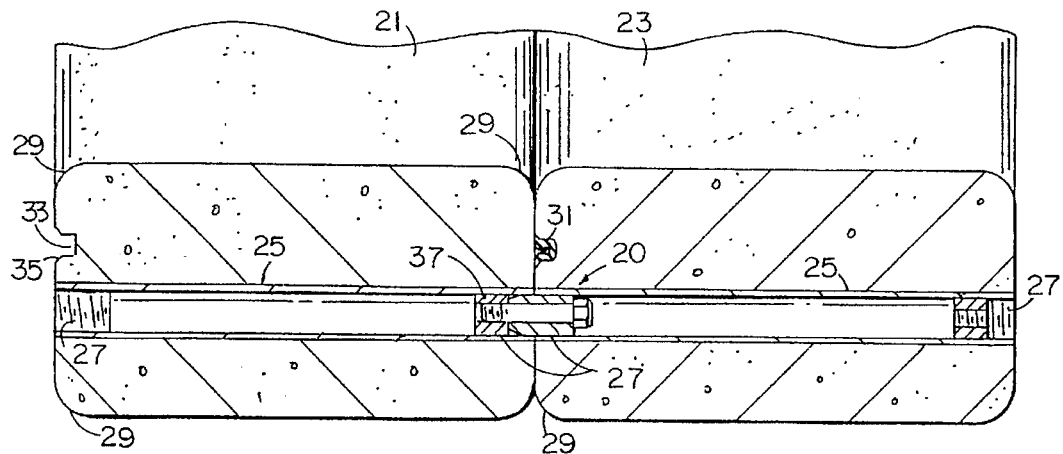
FIG. 1 is a fragmentary sectional view showing two concrete units joined together.

Referring to FIG. 1, a completed joint 20 is shown between two precast concrete structural units 21 and 23. The concrete units can be sections of a wall panel, a roof, a floor, a pavement or decking such as that used in the assembly of bridges, buildings or parking structures. It is specifically contemplated that the scope of the present invention includes many structural units other than those made with concrete, such as structural units made from reinforced and non-reinforced polymeric materials, composites, laminates, foamed concrete and other structural materials. Thus, the exemplary precast sections disclosed hereinafter are not intended to be interpreted as unnecessarily limiting.

Concrete structural unit 21 has a tubular member 25 therein which is cast within the concrete when the unit is formed. Tubular member 25 is preferably internally threaded at each end 27. Tubular member 25 is preferably proportioned to the size of the concrete unit into which it is cast. For example, for a large concrete unit eight to twelve feet long, a steel tube approximately two and one-half inches in outside diameter would be used. The tube would preferably have one-quarter inch wall thickness so the internal diameter of the tube would be two inches.

Concrete unit 21 is cast with rounded edges 29 to reduce the tendency for chipping along the edge of the unit. The edges of cast concrete units, for example pipes, tend to chip in handling which, if bad enough, can make the section of pipe useless.

In order to provide a fluid-tight seal between the ends of the concrete units, a gasket should be used. The gasket can be embedded into the concrete when it is poured to form the unit or it can be inserted into a groove formed in the face of the concrete unit. The inserted gasket is preferred since it can be added to and locked into the groove in the concrete unit at the construction site prior to joining the concrete units. It is also within the scope of the present invention to attach a gasket to an end of a concrete unit by means of an adhesive material. As shown in FIG. 1, the gaskets 31 are of the type which are inserted into a precast groove 33 in the end of the concrete unit. Groove 33 is provided with diverging walls 35 which provide a space for the gasket material to spread, as shown in concrete unit 23 when the units are brought together.

Concrete unit 23 also has tubular members 25 cast therein at the time it is formed. The tubular member, like member 25 in concrete member 21, has internally threaded end portions 27.

Figure 3:
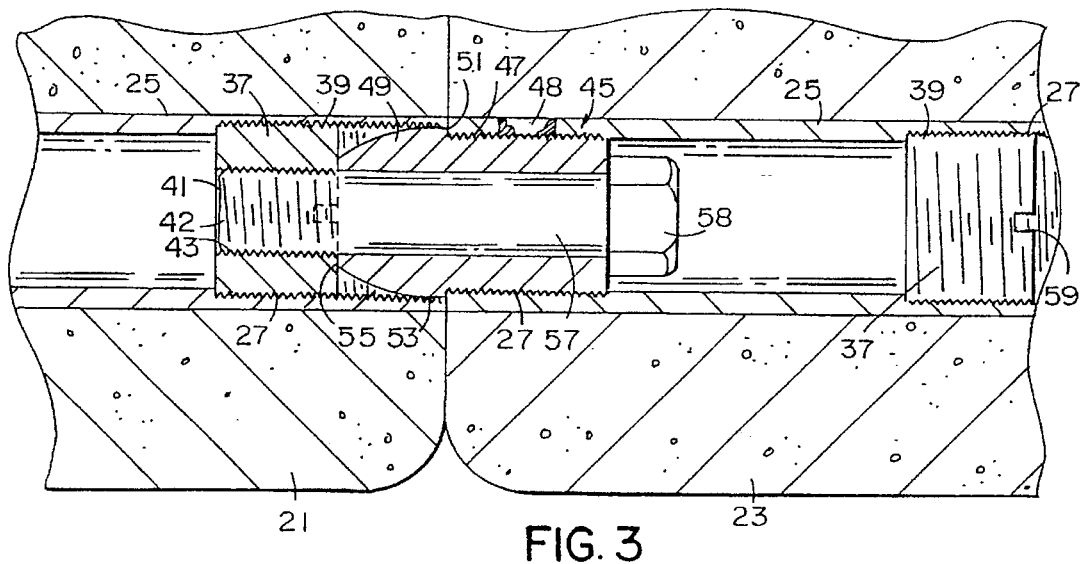
FIG. 3 is an enlarged fragmentary sectional view of a completed joint formed between two precast concrete units.

Prior to joining concrete units 21 and 23, and referring to FIG. 3 for clarity, an insert member 37 is threaded into tubular member 25 in concrete unit 21. Insert member 37 is made of steel and has an externally threaded portion 39 and an axial aperture or bore 41 which has an internal thread 43. A guide member 45 is threaded into tubular member 25 in concrete unit 23. Guide member 45 has a first threaded portion 47 which can be threaded into the end of tubular member 25 in concrete unit 23. Guide member 45 has a shaped end portion 49 which is preferably larger in diameter than threaded portion 47 forming a shoulder 51 which abuts the end of tubular member 25 when the guide member is threaded fully into position in the tubular member. Extending a short distance away from shoulder 51 is a circumferential shear band 53 which provides shear strength to the joint formed between the two concrete units. The shear band is approximately one-quarter inch in width. The shaped surface of the guide member then slopes toward an edge or face 55 which abuts or does not abut but is located proximate the insert member 37 when guide member 45 is inserted into concrete unit 21. Guide member 45 has an axial aperture or bore 57 which extends through the guide member and aligns with aperture 41 in insert member 37.

While it is preferred to employ internally threaded tubular members and threaded insert and guide members, it is within the scope of the present invention to use unthreaded members. Referring to FIG. 3, a port 48 is shown for providing access to the first portion of the guide member for welding it in place in the tubular member. A similar port can be provided for welding the insert member in place. The edge of the insert member can also be welded in place by reaching in through the open end of the tubular member with a welding rod. The axial shear bolt would still be used for joining the concrete units together.

Whether a threaded or smooth surfaced tubular member is used, it is important to keep the guide member from turning when the shear bolt is tightened. As can be seen in FIG. 3, when bolt 58 is tightened by turning in a clockwise direction, guide member 45 can unscrew out of the tubular member if it turns in the same direction. The rotation of the guide member 45 can be prevented by threading it tightly into the tubular member or by providing a reverse thread on guide member 45. Also, a small amount of adhesive can be used to glue the guide member in position. Also a small tack weld will hold it in place. A lock washer can also be used on the shear bolt between the insert member and the end of the guide member. While the lock washer can function to restrict rotation of the guide member, it is not preferred since it requires the use and handling of another part.

The concrete units are assembled moving from left to right, as shown in FIGS. 1 and 3. Insert member 37 is threaded into the end of tubular member 25 in concrete unit 21. Guide member 45 is threaded into the end of tubular member 25 in concrete unit 23. The concrete units are then brought together bringing end 49 of guide member 45 into the end of tubular member 25 in concrete unit 21. Face 55 on the guide member preferably abuts against or is otherwise positioned proximate the face of insert member 37. The axial passage 57 in guide member 45 aligns with axial passage 42 in insert member 37. A threaded bolt 58 is then inserted through tubular member 25 in concrete unit 23 and passes through guide member 45 to the internally threaded aperture in insert member 37. The bolt is then tightened to firmly join the two concrete units together. When the joint is bolted in place, the rubber gasket on one end of the concrete unit is compressed against the smooth end of the mating concrete unit to effect a fluid-tight face seal between the concrete units. Notably, the gasket seals the joint without being subjected to non-longitudinal loads such as shear loads or centering loads, and thus a longer lasting, more reliable sealed joint is achieved. After the joint is completed, another insert member 37 is threaded into the end of tubular member 25 in concrete unit 23 to prepare for the joining of the next concrete unit. In order to facilitate entry of the insert member, a slot 59 is provided in the face of the insert member into which a bladed tool can be inserted in order to easily rotate the insert member into position.

Now referring to FIG. 4, a second embodiment of the guide member 61 is shown. Like guide member 45, guide member 61 has a threaded portion 63 and a shaped portion 65. Shaped portion 65 has a compound surface with a machined circumferential shear band 67 adjacent the end of tubular member 25 and a sloping surface portion 69 which ends at face 71. The overall configuration of the shaped surface is that of a truncated cone with the circumferential shear band surrounding the base of the cone. Guide member 61 has an axial aperture or bore 73 through which a bolt 58 can be passed for insertion into and tightening into insert member 37. Tubular member 25' has a machined bore 66 that extends from the end of tubular member 25' to threads 39. Machined bore 66 saves installation time by allowing insert 37 to be slid partway into tubular member 25' (rather than threading insert 37 into tubular member 25' the entire distance). The machined bore 66 also provides a solid engagement with shear band 67 which includes precisely controlled dimensions.

In FIG. 4, gaps 72 and 72' are created between tubular members 25 and 25' by a resilient gasket compressed between concrete structural units. (For example, see FIGS. 7, 8, 10A and 16.) A tensioning spring 74 such as a Bellville washer or multiple dished washers is positioned under the head of bolt 58 or in gap 72 around bolt shaft 58' to maintain a predetermined amount of tension on the connection in spite of thermal expansion of the concrete structural units. This arrangement is contemplated to be useful when the concrete structural units will be used on roads, for example, where considerable thermal expansion is expected.

Figure 2:
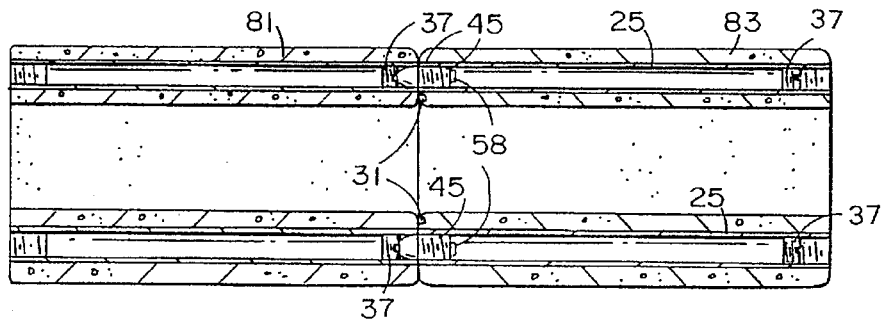
FIG. 2 is a sectional view showing two precast concrete pipes joined together.

As shown in FIG. 2, sections of precast concrete pipe 81 and 83 are joined together by insert members 37, guide members 45 and bolts 58. A gasket 31 surrounds the fluid passage in the connected pipes and is positioned between the fluid passage and the connecting hardware to protect the hardware from water or corrosive materials which might be passing through the pipe. As previously discussed, the pipe sections are connected from left to right with the joint being made and the bolt being inserted through guide member 45 into internally threaded insert member 37 and then tightened. The bolting action compresses the gasket causing a fluid-tight face seal to be formed between the face ends of the pipe section walls. Moving to the right after the joint is fastened together, an insert member 37 is inserted into the internally threaded end 27 of tubular members 25 in preparation for making the next joint. Insert member 37 is added after bolt 58 is tightened to secure the previously assembled joint. The insert member substantially closes the tubular member once the joint is complete.

In order to provide a fluid-tight joint, whether it be between pipe sections or sections of decking or pavement, a resilient gasket is preferably placed between the concrete units. Using the resilient gasket, a fluid-tight joint can be made without the addition or use of mortar or asphalt to seal the faces of the concrete sections forming the joint. The gasket is preferably made of a dense rubber-like polymeric material which can resist decomposition by water and its contaminants or, in the case of a pipe, whatever material is passing through the pipe.

As previously mentioned, the resilient gasket can be cast in place in the concrete unit when the unit is formed or can be added to a groove formed in the concrete unit. Referring to FIGS. 5, 6 and 7, two embodiments of a cast-in-place gasket are illustrated. In FIG. 5, the resilient gasket 91 has been cast in place in a concrete unit 93. The surface of the concrete unit has a concave depression 95 in which the gasket is centered. The cast-in-place gasket has a substantially rectangular base portion 97 which locks the gasket in place in the body of concrete. Extending upwardly, as shown in FIG. 5, are a pair of spaced resilient legs 99 which form the seal between concrete units 93 and 101. The concave depression in the surface of concrete unit 93 enables legs 99 to bend backward or away from each other, as shown in phantom. As illustrated in FIG. 5, concrete unit 101 is vertically descending upon concrete unit 93 and gasket 91. The joint assembly forces spread legs 99 of the gasket outwardly. If concrete unit 101 were entering either from the left or right, depression 95 provides room for the legs 99 to flex to the left or right in a windshield wiper-like manner to form the seal. The depression provides room to accommodate the legs of the gasket so that they are not crushed in forming the joint. The legs of the gasket are substantially retained in shape to push against the surface of concrete unit 101 forming a fluid-tight seal.

The resilient cast-in-place gasket 103 (FIG. 7) has a substantially triangular base portion 105 with a pair or upstanding spaced legs 107 and a center crown 109 along one edge of the gasket. The triangular base portion is cast in place in the concrete which again has a relieved or concave surface portion 111 to enable legs 107 to move maintaining a fluid-tight seal without being crushed by the mass of the concrete units.

Now referring to FIGS. 8 and 9A, a gasket 115 is shown which is inserted into a groove 117 which is formed in the surface of concrete unit 119 when it is cast. Groove 117 has a relieved surface 120 with angled walls. The bottom of the groove 121 is arcuately shaped. Gasket 115 has a pair of spaced legs 123 and an arcuate back portion 125 which substantially conforms to the arcuate configuration of base portion 121 of groove 117. In FIGS. 8 and 9A, a cord of polymeric material 127, commonly referred to as an O-ring cord, is shown in place at the bottom of the groove formed between spaced legs 123. In using gasket 115, the gasket is pushed into groove 117 in the surface of the concrete unit. The cord of polymeric material 127 is then lubricated with a water or soap solution to facilitate entry of the cord between the spaced legs of the gasket. The gasket and the cord are each made of resilient rubber-like material and it is very difficult to insert cord 127 between legs 123 in view of the friction which results from trying to move the rubber-like materials across each other. The water soluble lubricant or soap solution facilitates the entry of the cord into the bottom of the groove where it can spread the legs of the gasket, as shown in FIG. 8, to tightly lock the gasket against the sidewalls of groove 117. Once gasket 115 is placed in the groove in the concrete surface of the concrete unit, and is locked in place by cord 127, it is extremely difficult to pull the gasket out of the groove. The gasket, as shown in FIGS. 8 and 9A, is the preferred gasket since it can be added at the construction site at the last moment before the concrete units are joined together. This maintains the integrity of the gasket and avoids possible damage to the gasket which might occur in shipping and handling.

The gasket shown in FIG. 9B has sloping edge portions 128. This gasket is preferably used in joining concrete units where the edges will be pushed over like a wiper blade. The sloping end surfaces will tend to align with the face of the concrete unit forming a seal.

Figure 10B:
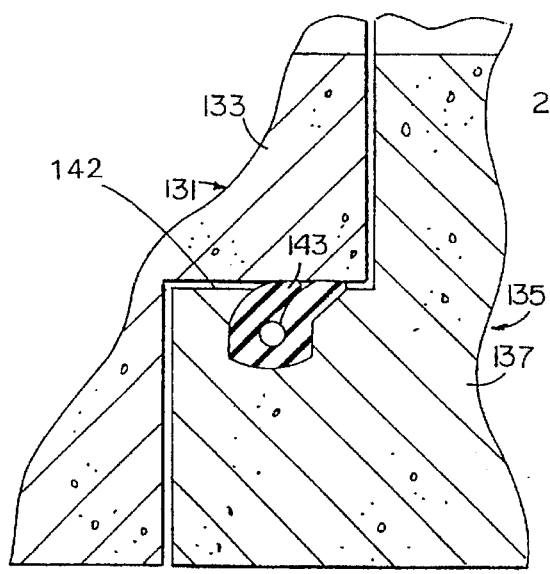
FIG. 10B is a sectional view showing a gasket on a substantially horizontal surface in a male and female joint.

Now referring to FIGS. 10A and 10B, a conventional male and female pipe joint is shown as commonly used with round, precast concrete pipe. In this type of joint, a first pipe section 131 would have an offset portion 133 while a second concrete pipe 135 would have a tapered portion 137. The tapered end is inserted into the opening bounded by the offset portion. By using the gasket material of the present invention, as shown in FIGS. 10A and 10B, the male and female pipe connections can be made without the necessity of the use of mortar or asphalt which tend to deteriorate over time causing the joint to leak. As shown in FIG. 10A, two positions are available for use with the resilient gasket. Gasket 139 is spread open as is gasket 141 by the direct force of the female portion of the pipe pressing against the male portion of the second pipe. Gasket 141 is positioned on the face of the tapered portion while gasket 139 is on the face of a surrounding shoulder. Turning to FIG. 10B, gasket 143 is on the top surface of the tapered portion and one leg is bent over the O-ring cord material in a windshield wiper-like manner as the two pipes telescope together. The two legs are bent over within the recessed portion of the groove and provide a fluid-tight seal for the pipe. Notably, the substantially horizontal surface 142 can be inclined for increasingly compressing gasket 143 as the pipe sections are brought together, if desired.

Figure 11:
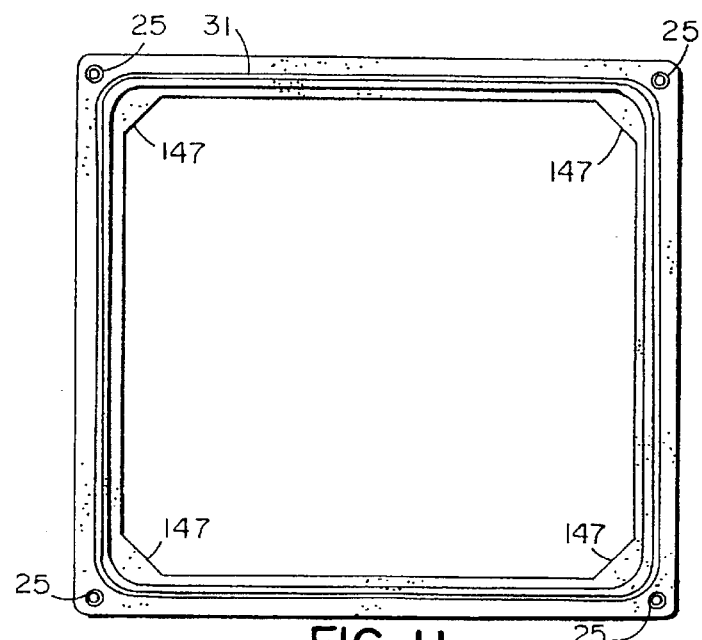
FIG. 11 is a sectional view of a section of precast concrete box pipe having a tubular member embedded in each corner.

In FIG. 11, an end view of a precast concrete box pipe is shown. The pipe is substantially square and has a tubular member 25 cast in each corner of the pipe between the edge of the pipe and the haunch 147 of the pipe. The tubular member is cast in the concrete as far away from the axial center of the pipe as possible consistent with the strength of the concrete surrounding the tubular member. A gasket 31 is on the face of the pipe and is between the fluid passage and tubular members 25 where the joining hardware is assembled. Mounting the gasket in this position prevents any liquid material in the pipe from contacting the connecting or joining hardware protecting the hardware from rust or corrosion.

Figure 13:
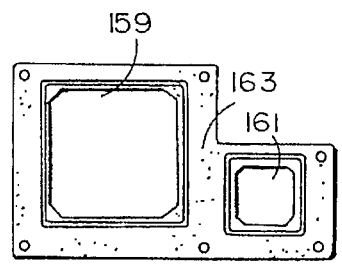
FIG. 13 is a sectional view of a double precast concrete box pipe having a common wall between each pipe and with the pipes being of different sizes.
Figure 12:
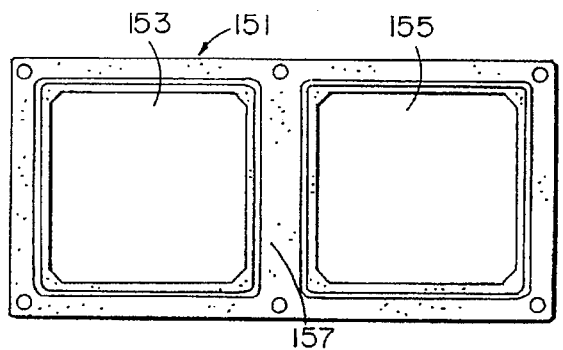
FIG. 12 is a sectional view of a double precast concrete box pipe having a common wall between each pipe.

In FIG. 12, a double box pipe 151 is shown having a fluid passage 153 and 155 separated by a common wall 157. In FIG. 13, a similar construction is shown; however, fluid passage 159 is substantially larger than fluid passage 161. Again, the two fluid passages are separated by a common wall 163 and resilient gaskets which prevent mixing or intermingling of the two fluid streams. The double wall or the double box pipe construction is particularly useful in handling both storm drains and sewage. The two fluid materials are separated in their passage through the pipe and can be treated separately at the treatment center where they exit the pipe. By use of the double walled pipe, the expense of laying two adjacent pipes is reduced, as well as the time spent in excavating a large trench for handling two pipes. By providing a common wall between the two pipes, the width of the pipe assembly is substantially reduced.

Figure 14:
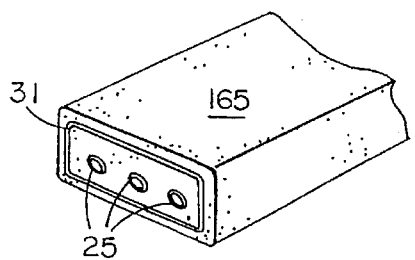
FIG. 14 is a partial perspective view of a section of precast pavement.

Referring now to FIG. 14, a precast section of pavement 165 is shown which can be used in highway or bridge construction, or for the floor, roof, or sidewalls of a building. The pavement section has a plurality of tubular members 25 cast into the concrete. A gasket 31 surrounds the tubular members since water and other corrosive materials would tend to flow from the surface toward the hardware used to assemble the pavement sections. When utilizing the precast section 165 in a road construction, precast section 165 would be positioned on a graded bed of sand or other bed material adjacent a previously positioned precast section 165. It is contemplated that the preparation of the bed would be generally similar to methods known in the art of road construction. The two adjacent precast sections 165 would then be interconnected as previously disclosed in this application. Advantageously, the resulting road construction would be continuously interconnected in a long assembly, with each pair of adjacent sections 165 interconnected to prevent undesirable lateral shifting (vertically or horizontally). Also, the gasket 31 and connection system allow thermal expansion of the sections 165 without buckling of the road construction. It is contemplated that the upper surface of section 165 can be planar or contoured, such as for channeling rain water and run-off or the like. Further, coating material such as tar or asphalt can be applied on the upper surface where particular road surfaces are desired. The coating material can be applied to the precast sections either before or after assembling the sections 165 together.

Figure 15:
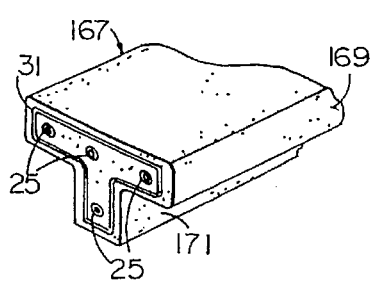
FIG. 15 is a partial perspective view of a section of precast decking.

In FIG. 15 a precast concrete section of T-type decking 167 is shown which is of the type frequently used in the construction of building structures, including floors, walls, or roofs, and parking structures. The section of decking has a wide, substantially flat top 169 which is supported by a vertical section 171. A plurality of tubular members 25 have been cast into the section of decking. A gasket 31 surrounds the tubular member since, like pavement section 165, water and other corrosive materials will tend to flow down from the surface onto the connecting hardware used to assemble the decking. Sections 165 (FIG. 4) and sections 167 (FIG. 15) also can be advantageously used in bridge constructions. For example, sections 167 can be placed on girders or bridge support structure for forming the decking or road forming portion of the bridge construction. The bridge support structure could be constructed by methods similar to methods known in the art of bridge building. Advantageously, the interconnected assembly would provide strength, and also provide increased safety and resistance to destruction by earthquakes and other catastrophic events.

Figure 16:
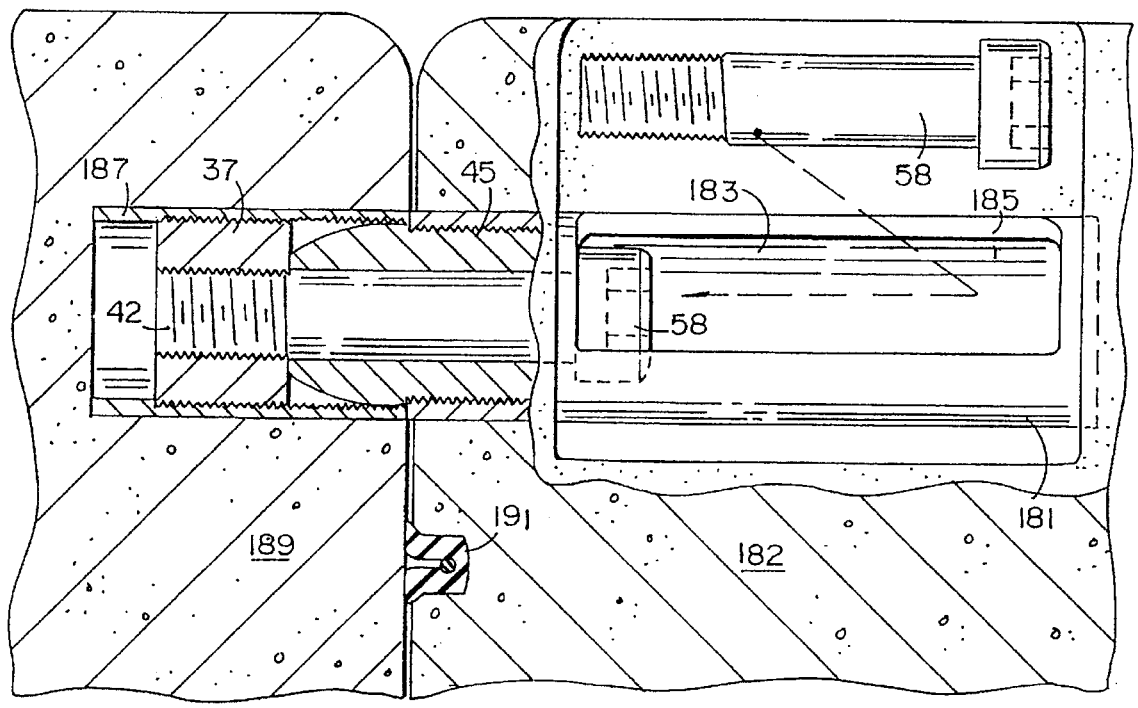
FIG. 16 is a fragmentary view of a concrete unit having a bolt window in the tubular member to facilitate the positioning of the shear bolt.

Referring to FIG. 16, a second embodiment of the apparatus for joining precast concrete units is shown for purposes of illustration, in a corner of a precast box pipe. A shortened tubular member 181 has been cast into the corner of box pipe section 182 having a bolt window 183 bounded by edge 185. A guide member 45 is positioned in the end of tubular member 181, as previously described. Since the bolt window is provided for inserting shear bolt 58, the tubular member does not have to extend fully across the concrete unit for insertion of the bolt into guide member 45 and on through into threaded aperture 42 in insert member 37. Insert member 37 is positioned in a shortened tubular member 187 positioned in a corner of a second precast concrete box pipe 189. A resilient gasket 191 provides a water-tight seal for the joint.

Figure 17:
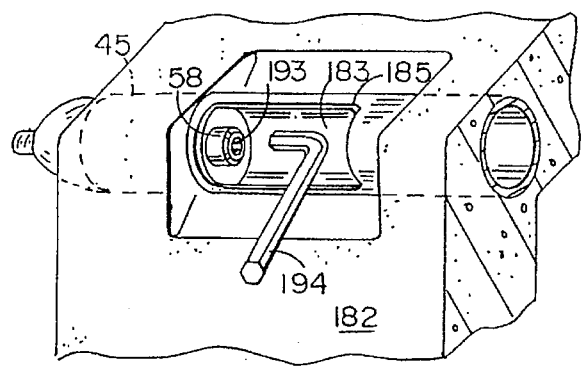
FIG. 17 is a partial perspective view of a concrete unit having a bolt window and showing the shear bolt positioned in the guide member.

In making the section of concrete box pipe 182, and referring to FIG. 17, bolt window 183 can be covered or filled with polystyrene or other suitable material to prevent concrete from entering into tubular member 181 through aperture 185 which defines the bolt window. The concrete can then be poured to form the box pipe.

After the concrete has hardened, the cover can be removed to provide access to the rear of guide member 45 for shear bolt 58. The head of bolt 58 has a shaped socket 193 for receiving an Allen-type wrench 194 for tightening bolt 58 into position. After the joint has been completed, the bolt window and portion of concrete unit 182 can be filled with concrete and shaped to conform to the rest of the corner of the concrete unit. If it is intended that the concrete units can be disassembled, the bolt window can be covered and then the concrete corner can be completed.

Figure 18:
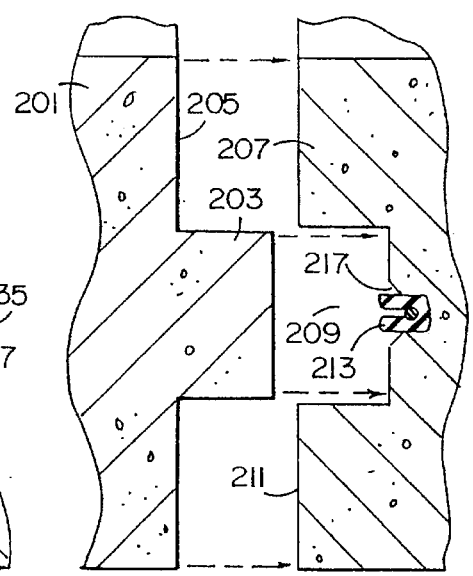
FIG. 18 is a schematic elevational view of a keyway joint including a gasket.

When a joint is made between two precast concrete units using the hardware of the present invention, the shear band on the guide member and the bolt provide the shear strength for the joint. It is within the scope of the present invention to provide a further increase in shear strength by shaping the end faces of the concrete units in a tongue-and-groove manner, as shown in FIG. 18. Concrete unit 201 has a projecting key 203 on the end face 205. A second concrete unit 207 has a recess or keyway 209 formed in surface 211. A resilient gasket 213 is mounted in a shaped groove 215 which has a relieved surface 217 on either side of the groove.

When units 201 and 207 are joined together by hardware (not shown) in order to simplify the drawing, key 203 will be positioned in keyway 209. The face of key 203 will press against gasket 213 to provide a fluid-tight seal while the tongue-and-groove fit of 203 and 209 will substantially increase the shear strength of the joint between the concrete units.

Figure 19:
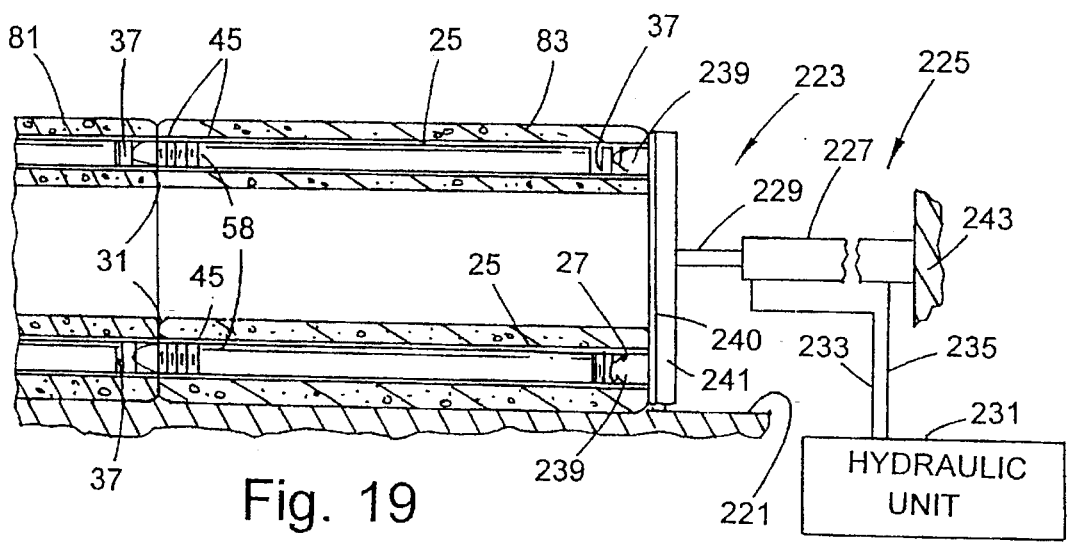
FIG. 19 is a schematic sectional view showing a method of jacking a column of concrete pipes using a jacking apparatus.

Advantageously, an elongated assembly of precast concrete units such as the precast concrete units 81 and 83 can be jacked along a channel or tunnel (FIG. 19), such that each successive concrete units can be placed on the channel/tunnel floor 221 at a common loading station 223. A jacking device 225 is positioned adjacent loading station 223. Jacking device 225 includes one or more actuators such as a hydraulic cylinder 227 and an extendable piston/rod 229, and a powering unit such as a hydraulic unit 231 for selectively supplying pressurized hydraulic fluid through hydraulic lines 233 and 235 to extend and retract piston/rod 229 within cylinder 227. A pipe engaging fixture 237 includes bullet-shaped projections 239 for engaging two (or more) ends 27 of tubular members 25 mounted on a flat plate 240 at least as large as the shape and size of the end of unit 81 to be pushed. Fixture 237 also includes reinforcement beams 241 for supporting flat plate 240. Cylinder 227 is supported by a back-stop 243 such that when piston/rod 229 is extended, the concrete pipe section 83, and all previously set pipe sections (such as pipe section 81) are forcibly jacked along channel/tunnel floor 221. Since the pipe sections 83 and 81 and others are interconnected, the interconnected arrangement forms an elongated assembly that can be extended a substantial distance, limited only by the physical characteristics of the pipe sections, the jacking device, and the physical on-site environment. Notably, it is contemplated that fixture 237 will not be connected by bolts (58) to pipe section 83. However, it is conceivable that fixture 237 could be connected by bolts (58) to pull one or more of the elongated assembly of pipe sections in a reverse direction, if desired. Notably, fixture 237 may include supports (not shown) for supporting plate 240 and projections 239 at a given height above channel/runnel floor 221. Alternatively, a track or roller (not shown) could be located under plate 240 engaging floor 221 to facilitate engaging projections 239 with lube ends 27.

It may be desirable when jacking an elongated assembly of pipe sections (81, 83) to position an anti-chip member between the abutting end faces of pipe sections 81 (and 83) to prevent chipping and degradation of the end faces due to lateral shifting as the pipe sections are moved longitudinally. The anti-chip member could be a sheet of polymeric material, a piece of plywood, lubricous coating or other material accommodating the relative movement and shifting between pipe sections (such as pipe sections 81 and 83). However, it is contemplated that the gasketing arrangement shown in FIGS. 1, 2, 10A, 16 and 18 will work satisfactorily since, in the illustrated embodiment, lateral shifting creating shearing forces on the gasket is substantially prevented by guide members 45 and tubular members 25.

It can be seen from the above description that an improved apparatus is provided for connecting precast concrete units. The units can be connected using hardware installed on site and are tightly fastened together by bolts. The use of bolts substantially simplifies the assembly of the precast concrete units into whatever structure is desired. Also, the precast concrete units can be prepared under substantially identical conditions so that each section cures the same way. This is important in pavement sections since the individual sections will expand or contract to the same extent, avoiding unnecessary ridges and bumps which normally occur in highway sections poured at different times of day under different sunlight and moisture conditions.

Although the invention has been described with respect to specific preferred embodiments thereof, many variations and modifications will become apparent to those skilled in the art. It is, therefore, the intention that the appended claims be interpreted as broadly as possible in view of the prior art to include all such variations and modifications.

The embodiments of the invention in which an exclusive property or privilege is claimed are defined as follows:

1. An apparatus for joining structural units comprising:
   a first tubular member for mounting in a first structural unit;
   a guide member for mounting in said first tubular member, said guide member having a first portion for insertion into said first tubular member and a second portion having a shaped surface which will project beyond an end of said first tubular member when said guide member is in place in said first tubular member, said guide member having an axial aperture therein;
   a second tubular member for mounting in a second structural unit in a position to be aligned with said first tubular member when said structural units are joined together;
   an insert member for mounting in said second tubular member, said insert member having an internally threaded aperture therein; and
   a fastener member, said fastener member extending through said axial aperture in said guide member into said internally threaded aperture in said insert member to join together said first and second structural units.

2. An apparatus for joining together structural units as set forth in claim 1 wherein:
   said first tubular member having an internally threaded portion; and
   said first portion of said guide member is threaded for threaded attachment in said threaded portion of said first tubular member.

3. An apparatus for joining together structural units as set forth in claim 1 wherein an internal diameter of an end portion of said second tubular member is enlarged to receive said second portion of said guide member.

4. An apparatus for joining together structural units as set forth in claim 1 wherein said surface of said second portion of said guide member has a rounded surface to facilitate entry into said second tubular member.

5. An apparatus for joining together structural units as set forth in claim 1 wherein said second portion of said guide member has a tapered surface to facilitate entry into said second tubular member.

6. An apparatus for joining together structural units as set forth in claim 1 including means for preventing said guide member from turning under the influence of said fastener member.

7. An apparatus for joining together structural units as set forth in claim 1 wherein said first tubular member has an aperture near one end thereof to provide access to the first portion of said guide member for welding said guide member in place in said first tubular member.

8. An apparatus for joining together structural units as set forth in claim 1 wherein said second portion of said guide member has a substantially cylindrical surface portion adjacent to the end of said first tubular member to provide increased shear strength to a joint formed between said first and second tubular members.

9. An apparatus for joining together structural units as set forth in claim 1 wherein said fastener member is threaded for attachment to the internally threaded aperture in said insert member.

10. An apparatus for joining together structural units as set forth in claim 1 wherein said insert member has a slot in one surface thereof to facilitate insertion into an internally threaded portion of said second tubular member.

11. An apparatus for joining together structural units as set forth in claim 1 wherein said second portion of said guide member is larger in diameter than said first portion and said guide member and has a circumferential shoulder connecting said first and second portions, said shoulder butting against an edge of said first tubular member when said guide member is in place in said first tubular member.

12. An apparatus for joining together structural units as set forth in claim 1 wherein said fastener member is a bolt.

13. An apparatus for joining together structural units as set forth in claim 1 wherein said structural units include concrete.

14. An apparatus for joining structural units set forth in claim 1 wherein said structural units each have at least one aperature through which said fastener member can pass to align the fastener member with the first tubular member so that the fastener member can be inserted axially into the axial aperture in said guide member.

15. An apparatus for joining precast structural units comprising:

a first tubular member for mounting in a structural unit, having an internally threaded portion at one end;

a guide member for mounting in said end of said first tubular member, said guide member having a threaded surface portion for attachment to said first tubular member and a shaped portion extending away from said first tubular member when said guide member is attached to said first tubular member, said guide member having an axial aperture therein;

a second tubular member for mounting in a structural unit in a position to be aligned with said first tubular member;

an internally threaded portion proximate one end of said second tubular member for receiving said shaped end portion of said member;

a threaded insert member threadably mounted within said second tubular member, said insert member having an internally threaded axial aperture therein; and a threaded fastener member, said fastener member extending through said axial aperture in said guide member into said internally threaded aperture in said insert member for joining together said first and second tubular members when said guide member is received within the threaded portion of said second tubular member.

16. An apparatus for joining precast structural units as set forth in claim 15, wherein said internally threaded portion of said second tubular member is relieved for receiving said shaped portion of said guide member.

17. A resilient gasket for insertion in a groove in a precast structural unit comprising:

a U-shaped sealing member comprising a preformed rubber material having a base portion and a pair of spaced extending resilient leg portions, said sealing member configured to fit mateably in said groove in the precast structural unit with the spaced leg portions extending outwardly; and a separate elongated locking member comprising an "O" ring insertable into the bottom of a space between said legs to spread portions of said legs adjacent said base portion to lock said gasket in said groove in said precast structural unit.

18. A resilient gasket for insertion in a groove in a precast structural unit as set forth in claim 17 wherein said base portion is trapezoidally-shaped to securely engage the groove.

19. A resilient gasket for insertion in a groove in a precast structural unit as set forth in claim 17 wherein said elongated member has a circular cross section.

20. A resilient gasket as defined in claim 17 wherein said spaced leg portions are configured to flex in a predetermined lateral direction as said sealing member is contacted for sealingly engaging another structural unit in a longitudinal direction.

21. A precast structural unit comprising:

an elongated structural member with flush end faces, said end faces being bounded by a rounded edge;

a plurality of spaced linear tubular members in said structural member, the ends of said tubular members being substantially flush with said end faces on said structural member and said tubular members being threaded for attachment.

22. A precast structural unit as set forth in claim 21 wherein said structural member is a pipe section.

23. A precast structural unit as set forth in claim 21 wherein said structural member is a deck member.

24. A precast structural unit as set forth in claim 21 wherein said structural member is a pavement section.

25. A precast structural unit as set forth in claim 21 wherein said structural member is a panel member.

26. A precast structural unit as set forth in claim 21 including a guide member supported at one end of each of said tubular members, each of said guide members including a first portion engaged with said one end for supporting said each guide member in said one end of the tubular member and a second portion with a shaped surface to facilitate entry into another tubular member in another structural member, said each guide member having an axial aperture therein; and an insert member in an opposite end of each of said tubular members, said insert member having an axial aperture therein.

27. A precast structural unit as set forth in claim 26, wherein each end of said tubular members are internally threaded and said first portion of each of said guide members are threaded for attachment to said tubular members; and each of said insert members are also threaded for attachment to said ends of said tubular members.

28. A precast structural unit as set forth in claim 26 wherein an internal diameter of the ends of said tubular members including said insert member is of a larger diameter than the remainder of said tubular members to facilitate entry of said guide member when said structural units are joined together.

29. A structural unit as set forth in claim 21 wherein said structural member is a bridge member.

30. A structural unit as set forth in claim 21 wherein said structural member is a building member.

31. A structural unit as set forth in claim 21 wherein said structural member includes concrete.

32. A structural unit comprising:
   a structural member having spaced end surfaces and defining a longitudinal axis;
   a plurality of linear tubular members cast into said structural member, said tubular members being aligned with the longitudinal axis of said structural member and being open proximate the end surfaces of said structural member; and
   a resilient deformable gasket in place in at least one end surface of said structural member.

33. A structural unit as set forth in claim 32 wherein said resilient gasket is positioned between said tubular members and a surface of said structural member from which liquid can flow to reach said tubular members.

34. A structural unit as set forth in claim 32 wherein said resilient gasket includes a portion for locking said gasket in said structural member and a sealing portion extending from said locking portion.

35. A structural unit as set forth in claim 34 wherein at least one of the end surfaces of said structural unit is relieved on each side of said resilient gasket to provide room for said sealing portion of said gasket to move in forming a seal.

36. A structural unit as set forth in claim 34 wherein said locking portion of said resilient gasket is cast in place in an end surface of said structural member.

37. A structural unit as set forth in claim 32 wherein said resilient gasket is in a groove in an end surface of said structural member.

38. A structural unit as set forth in claim 37 including a second resilient gasket located in a second groove in the end surface of said structural member.

39. A structural unit as set forth in claim 37 wherein said end surfaces include first and second end surfaces separated by a third end surface, said first and second end surfaces being generally perpendicular to said longitudinal axis and said third end surface being generally parallel said longitudinal axis, said resilient gasket being located on one of said first, second and third end surfaces.

40. A structural unit as set forth in claim 32 wherein said structural member is made substantially of concrete.

41. A structural unit as defined in claim 32 wherein said resilient gasket, when positioned in the structural member, comprises a substantially continuous strip of material.

42. A precast concrete structural assembly comprising:
   a first concrete structural unit defining a longitudinal direction and having end surfaces generally perpendicular to the longitudinal direction;
   a second concrete structural unit having end surfaces also generally perpendicular to the longitudinal direction; and
   a preformed resilient deformable, gasket member supported and retained on an end surface of said first concrete, structural unit and extending generally along and around a perimeter of the end surface, said first and second concrete structural units being joined together with said resilient gasket member being compressed between said structural units to provide a water-tight seal that extends generally around the perimeter.

43. A structural assembly as set forth in claim 42 wherein said first structural unit defines a longitudinal axis and said end surfaces are substantially perpendicular to the longitudinal axis of said structural units.

44. A structural assembly as set forth in claim 42 wherein a first of said end surfaces includes a tongue and a second of said end surfaces includes a groove forming a tongue-and-groove relationship.

45. A structural assembly as set forth in claim 44 wherein one of said end surfaces includes a gasket receiving groove for holding said gasket member.

46. A structural assembly as set forth in claim 45 wherein said one end surface includes a pair of said gasket receiving grooves.

47. A structural assembly as set forth in claim 45 wherein said tongue includes opposing sides, and each of said opposing sides includes a gasket receiving groove.

48. A structural assembly as set forth in claim 45 wherein said gasket receiving groove has an enlarged bottom to interlockingly engage said gasket member.

49. A structural assembly as set forth in claim 42 wherein said first and second structural units are made in part from concrete.

* * * * *